No. 676,163. Patented June 11, 1901.
D. VICTOR.
TRUCK.
(Application filed Mar. 18, 1901.)
(No Model.)
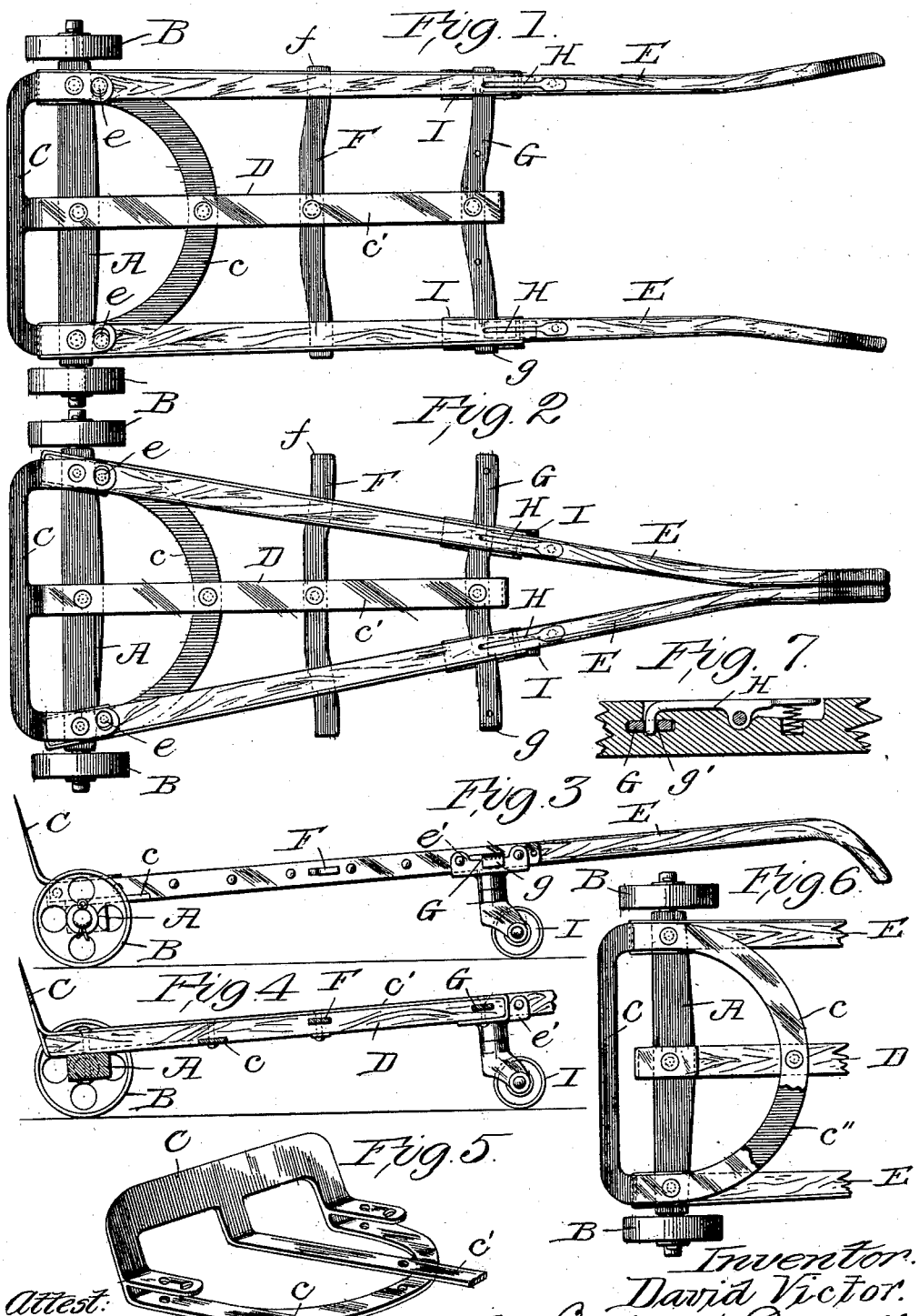
Inventor:
David Victor.
by Bakewell & Cornwall
Attys.
Attest:

UNITED STATES PATENT OFFICE.

DAVID VICTOR, OF ST. LOUIS, MISSOURI, ASSIGNOR OF ONE-HALF TO PAUL BAKEWELL AND FREDERICK R. CORNWALL, OF SAME PLACE.

TRUCK.

SPECIFICATION forming part of Letters Patent No. 676,163, dated June 11, 1901.

Application filed March 18, 1901. Serial No. 51,686. (No model.)

*To all whom it may concern:*

Be it known that I, DAVID VICTOR, a citizen of the United States, residing at the city of St. Louis, in the State of Missouri, have invented a certain new and useful Improvement in Trucks, of which the following is a full, clear, and exact description, such as will enable others skilled in the art to which it appertains to make and use the same, reference being had to the accompanying drawings, forming part of this specification, in which—

Figure 1 is a top plan view of my improved truck, showing the handles opened to form a two-handle truck. Fig. 2 is a similar view showing the handles closed to form a single-handle truck. Fig. 3 is a side elevational view. Fig. 4 is a vertical sectional view through the front part of the truck. Fig. 5 is a detail view of the pick-up iron and brace. Fig. 6 is a plan view of a modified form of pick-up iron, and Fig. 7 is a detail view of the lock for holding the handles in adjusted positions.

This invention relates to a new and useful improvement in trucks, the object being to construct a device of the character described in such manner that it can at will be converted into a single or double handle truck, swivel-rollers being provided from the handles whereby said truck can be used as a four-wheel truck or tilted and rolled on the two front wheels, as is usual.

The invention consists in the construction, arrangement, and combination of the several parts, all as will hereinafter be described and afterward pointed out in the claims.

In the drawings, A indicates the axle upon which are mounted the wheels B.

C indicates what is commonly designated as the "pick-up" iron, which is secured in a suitable manner to the axle, said pick-up iron having a curved brace portion $c$, extending rearwardly and forming a support for the mid-rib D. This mid-rib, as shown in Fig. 4, rests upon the axle and is fastened on top by a tongue extension $c'$, projecting from the pick-up iron, said tongue extension being preferably bent around the rear end of the mid-rib, as shown. Instead of having the tongue $c'$ extending rearwardly from the pick-up iron said pick-up iron may be provided with an additional semicircular brace $c''$, as shown in Fig. 6, which rests upon the upper faces of the handle and mid-rib, while the brace $c$ is arranged upon the lower faces of said parts.

E indicates the handles, which have their front ends resting upon the axle-bar, said handles being pivoted upon bolts or rivets $e$, whereby their free ends may be moved laterally. To strengthen the free ends of the handles, the mid-rib is provided with cross-bars F and G, which cross-bars pass through openings in the handles and serve as guides and supports therefor. The opposite ends of the bars are bent down, as at $f$ and $g$, respectively, to limit the outward movement of the handles, the other ends of said bars being straight to enable their introduction through the several openings which are designed to receive them.

The bar G is preferably perforated, as at $g'$, for receiving the end of a locking-lever H, (see Fig. 7,) one of said levers being pivotally mounted in each handle, a spring being provided to force the bent end of the lever into the opening to lock the handle in its adjusted position. In the drawings these locking-levers are shown on top of the handles; but in practice I prefer to arrange them on the under side of the handles, so that they will be out of the way of the load carried by the truck. Each handle, preferably at a point coincident with its engagement with the bar G, is provided with a bracket $e'$, in which is mounted a swiveled caster-roller I.

The construction above described can be used as a four-wheel truck, as is readily understood. When the handles are open, as shown in Fig. 1, the truck can be used as an ordinary two-handle truck, and when it is desired to use the device as a single-handle truck the locking-levers are manipulated and the handles moved inwardly, as shown in Fig. 2, in which position the locking-levers engage the perforations of the cross-bar G and lock said handles in place. I prefer to construct the handles so that their extremities run parallel a short distance when in a closed position, as shown.

The structure above described is extremely strong and rigid in its adjusted positions and the parts are not liable to get out of order.

I am aware that minor changes in the arrangement, construction, and combination of the several parts can be made and substituted for those herein shown and described without in the least departing from the nature and principle of my invention.

Having thus described my invention, what I claim, and desire to secure by Letters Patent, is—

1. In a truck, the combination with the axle-bar, of a pick-up iron arranged thereon and provided with a rearward extension forming a brace, and handles pivoted to said pick-up iron; substantially as described.

2. In a truck, the combination with the axle-bar, of a pick-up iron arranged thereon, a mid-rib attached to said pick-up iron and axle-bar, and handles pivoted to the ends of the axle-bar; substantially as described.

3. In a truck, the combination with an axle-bar, of handles pivoted thereto, a mid-rib, and cross-bars secured to the mid-rib for supporting the handles; substantially as described.

4. In a truck, the combination with an axle-bar, of pivoted handles, a mid-rib, a cross-bar carried by said mid-rib, and pivoted levers on the handles for engaging perforations in the cross-bar; substantially as described.

5. In a truck, the combination with the axle-bar, of pivoted handles, a mid-rib carrying a cross-bar with which said handles engage, means on the handles for locking the same in adjusted positions on the cross-bar, and swiveled caster-wheels arranged on the handles; substantially as described.

6. In a truck, the combination with the axle-bar, of a mid-rib, cross-bars F and G bent at one of their ends to form stops, pivoted handles coöperating with said stops and locking devices carried by the handles and coöperating with one of said cross-bars; substantially as described.

7. In a truck, the combination with the axle-bar, of a pick-up frame arranged thereon, handles pivoted to said frame, a mid-rib carrying cross-bars coöperating with the handles, and swiveled caster-rollers arranged on the free ends of the handles; substantially as described.

In testimony whereof I hereunto affix my signature, in the presence of two witnesses, this 13th day of March, 1901.

DAVID VICTOR.

Witnesses:
 GEORGE BAKEWELL,
 ANNA S. GRAY.